Figure 1:
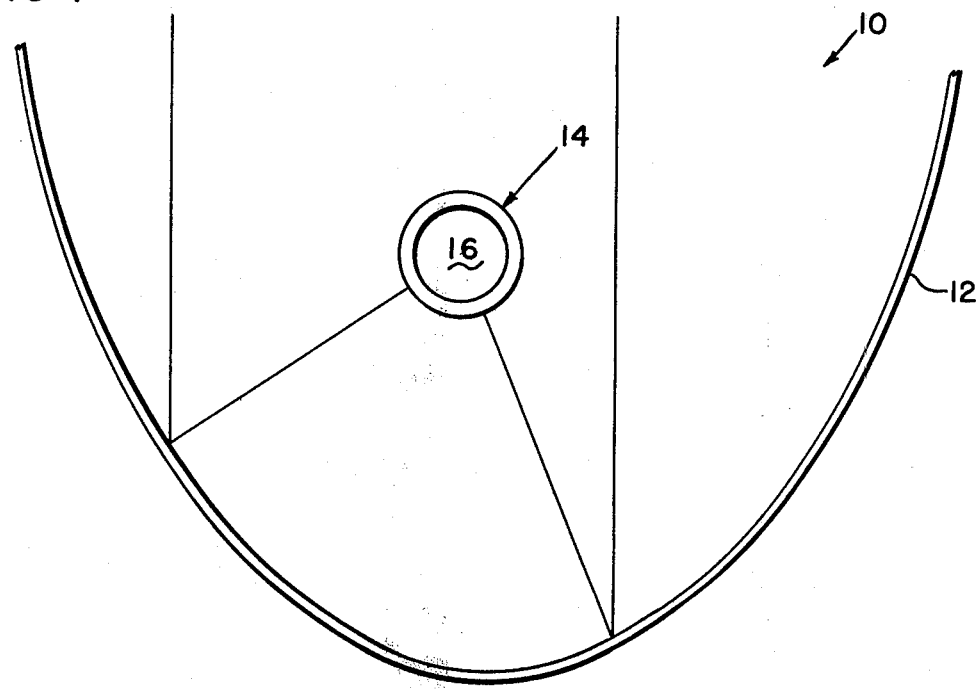

United States Patent [19]

Uroshevich

[11] 4,261,336

[45] Apr. 14, 1981

[54] SOLAR ENERGY RECEIVERS

[75] Inventor: Miroslav Uroshevich, Cincinnati, Ohio

[73] Assignee: Alpha Solarco Inc., Cincinnati, Ohio

[21] Appl. No.: 52,084

[22] Filed: Jun. 25, 1979

[51] Int. Cl.³ .................................................. F24J 3/02
[52] U.S. Cl. .................................... 126/438; 126/442; 126/449
[58] Field of Search ............... 126/438, 439, 440, 442, 126/443, 449, 901; 165/DIG. 2, 133

[56] References Cited

U.S. PATENT DOCUMENTS

| 1,814,897 | 7/1931 | Coxe | 126/438 |
|---|---|---|---|
| 3,154,141 | 10/1964 | Huet | 165/133 |
| 4,048,980 | 9/1977 | Googin et al. | 126/447 |
| 4,134,391 | 1/1979 | Mahdjuri et al. | 126/438 |

Primary Examiner—James C. Yeung
Attorney, Agent, or Firm—Gary M. Gron

[57] ABSTRACT

The disclosure illustrates a receiver for focused solar radiation. The portion of the receiver in the path of the reflected radiation has a microporous surface to enhance reception of solar radiation while the remainder of the surface has a highly polished receiver to minimize radiation losses.

4 Claims, 2 Drawing Figures

SOLAR ENERGY RECEIVERS

The present invention relates to solar energy and more particularly to solar energy receivers that receive focused solar radiation.

One of the better ways to increase the efficiency of a solar collector is to utilize a reflector to concentrate the beam component of solar radiation on a receiver placed at the focal point of the reflector. Usually the reflector is elongated and has a concave and preferably parabolic cross-sectional configuration. The receiver ends up being a tube whose axis is as coincident as possible with the focal line of the reflector.

It is well known that the radiation heat losses from a solar energy collector is a direct function of the surface area of the receiver. It is for this reason that the focusing collector offers performance that is superior to the flat plate collector.

Attempts have been made to increase the amount of radiation absorbed by the receiver through a reshaping of its exterior surface. Examples of this may be found in U.S. Pat. No. 4,153,039 where a series of sharp walled axiably extending grooves are formed around the perifery of the receiver. The purpose of this treatment is to increase the radiation reflected onto the receiver and thus the heat energy input. The increased surface area associated with this type of device however means greater radiation heat losses which must be compensated for by additional insulation which adds to the complexity and expense of the collector.

The above problems are solved in a receiver for focused solar radiation wherein only the portion of the receiver surface that is in the path of reflected solar radiation is microporus to maximize reception of solar radiation. The remainder of the surface is relatively smooth to minimize radiation heat loss.

Figure 2:
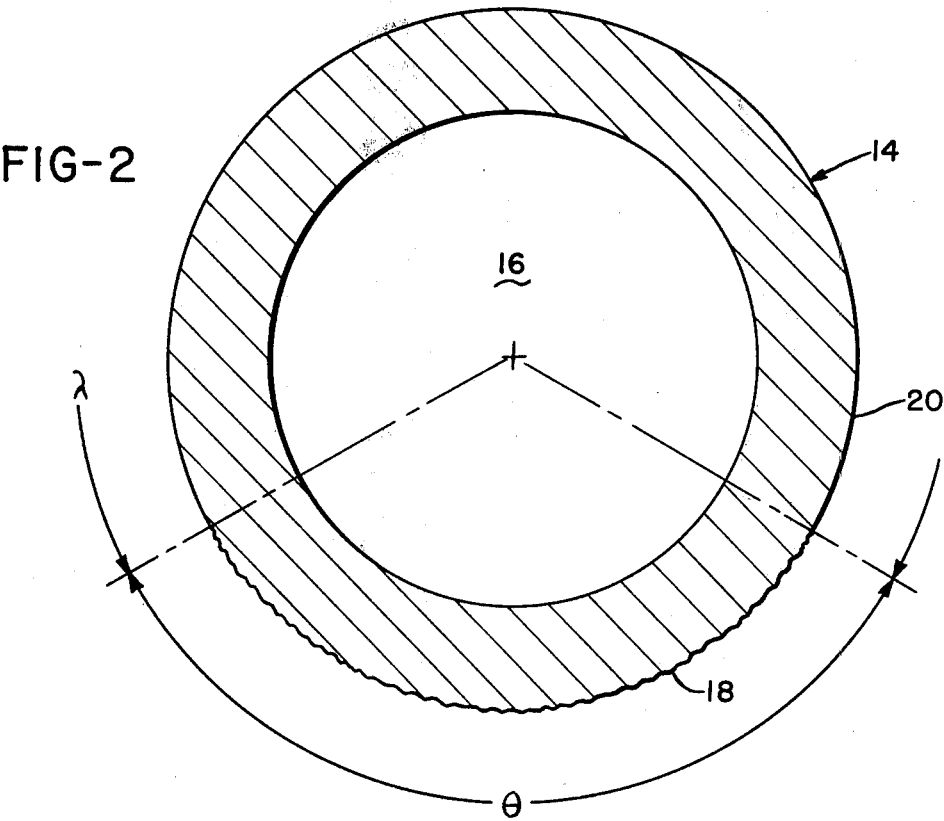

The above and other related features of the present invention will be apparent from a reading of the following description of the disclosure shown in the accompanying drawings, and the novelty thereof pointed out in the appended claims:

In the drawings:

FIG. 1 is a cross-sectional view of a focusing collector having a receiver which embodys the present invention, and FIG. 2 is a greatly enlarged cross-sectional view of the collector of FIG. 1 showing the surface configuration of the receiver.

Referring to FIG. 1 there is shown a solar collector 10 of the focusing type. It consists of a reflective enlongated surface 12 having a parabolic or other curved cross sectional configuration so that the beam component of solar radiation striking the surface of reflector 12 will be focused along axis A. An elongated heat conductive receiver 14 having a generally cylindrical outer surface is positioned along axis A to receive solar radiation. The interior of receiver 14 has a passage 16, also usually cylindrical, for a suitable heat transfer fluid which is circulated to carry heat away from receiver 14 for a useful purpose.

In accordance with the present invention, the outer surface of receiver 14 is selectively configured to enhance reception of solar energy and minimize radiation losses. For this purpose an arc like portion 18 of the interior of receiver 14 is microporus while the remaining surface 20 is made smooth.

The microporosity is achieved by air blasting the surface with microscopic particles. Particles of varying size may be used for this purpose as shown particularly in FIG. 2. The energy acceptance angle $\theta$ for a parabolic receiver is about 180° degress while the loss angle $\Delta$ for radiated heat is 180° degrees. Thus, the surface of receiver 14 is blasted over a up to 180° degree arc, usually by masking the limits of the treated area.

The resultant microporosity in the energy acceptance area means a greatly increased surface area for reception and reflection into receiver 14 of the beam component of solar radiation. At the same time, however, the area over which the radiation heat losses occur is made smooth to minimize the surface area and thus minimize the heat losses. The net effect is a substantially increased efficiency for the solar collector. The added cost of treating the receiver 14 to produce increased efficiency is minimal as the process may be automated to treat continuous lengths of tubular like elements.

Although a preferred embodyment has been described it should be apparent to those skilled in the art that it may be practical in other forms without departing from the spirit and scope thereof.

Having thus described the invention, what is claimed as novel and desired to be secured by letters patent of the United States is:

1. A receiver for the reflected beam component of solar radiation, said receiver comprising:
an elongated heat conductive element having a cylindrical outer configuration, the portion of the circumference of said element that receives reflected solar radiation having a microporus surface to receive maximum solar radiation and the remaining circumference having a highly polished surface for minimizing radiation heat losses, said microporus surface being formed by blasting said receiver with microscopic particles.

2. Apparatus as in claim 1 wherein said microporus surface is between up to 180°, and up to 180° degrees of the circumference of said receiver.

3. Apparatus as in claim 1 wherein said element has a longitudinal passage for a fluid for carrying heat away from said receiver to produce a useable heat output.

4. Apparatus as in claim 3 further comprising a reflector for focusing the beam component of solar radiation onto said receiver.

* * * * *